United States Patent
Kubota et al.

(10) Patent No.: US 9,972,280 B2
(45) Date of Patent: May 15, 2018

(54) DISPLAY CONTROL DEVICE, INPUT OPERATION DEVICE, AND AIR TRAFFIC CONTROL SYSTEM

(75) Inventors: Takashi Kubota, Aichi-ken (JP); Takahiro Katoji, Aichi-ken (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 559 days.

(21) Appl. No.: 12/694,364

(22) Filed: Jan. 27, 2010

(65) Prior Publication Data

US 2010/0214193 A1    Aug. 26, 2010

(30) Foreign Application Priority Data

Feb. 26, 2009    (JP) .................................. 2009-044906

(51) Int. Cl.
*G09G 5/14* (2006.01)
*G06F 3/038* (2013.01)
(Continued)

(52) U.S. Cl.
CPC ............... *G09G 5/14* (2013.01); *G06F 3/038* (2013.01); *G06F 3/0481* (2013.01); *G06F 3/14* (2013.01);
(Continued)

(58) Field of Classification Search
CPC ...... G09G 5/14; G09G 2380/12; G06F 3/038; G06F 3/0481; G06F 2203/0383; G06F 3/14; G06F 2203/0382
(Continued)

(56) References Cited

U.S. PATENT DOCUMENTS 5,838,300 A * 11/1998 Takagi .................... G06F 3/038
                                                        345/157
8,407,624 B2 * 3/2013 Ramsay et al. ............... 715/856
(Continued)

FOREIGN PATENT DOCUMENTS

JP    2000-99233    4/2000
JP    2003-281101    10/2003
(Continued)

OTHER PUBLICATIONS

Japanese Office Action dated May 17, 2011 in corresponding Japanese Patent Application No. 2009-044906 w/English translation.
(Continued)

*Primary Examiner* — Jose Soto Lopez
(74) *Attorney, Agent, or Firm* — Wenderoth, Lind & Ponack, L.L.P.

(57) ABSTRACT

A display control device includes an information discriminating unit that, upon receiving from one of a plurality of input operation devices identification information of the input operation device, identification information of an application, and input instruction information for the application, outputs the received input instruction information to the corresponding application, and a display processing unit that reflects a screen transition caused by application processing based on the input instruction information on a screen of a shared display device, and the display processing unit sends information regarding screen layout of the shared display device to each of the input operation devices at predetermined timing.

7 Claims, 5 Drawing Sheets

(51) Int. Cl.
   *G06F 3/0481* (2013.01)
   *G06F 3/14* (2006.01)
(52) U.S. Cl.
   CPC ............... *G06F 2203/0382* (2013.01); *G06F 2203/0383* (2013.01); *G09G 2380/12* (2013.01)
(58) Field of Classification Search
   USPC .......................................................... 345/2.2
   See application file for complete search history.

(56) References Cited

U.S. PATENT DOCUMENTS

| | | | | |
|---|---|---|---|---|
| 2004/0024819 | A1* | 2/2004 | Sasaki | H04L 12/1813 709/205 |
| 2006/0107226 | A1* | 5/2006 | Matthews | G06F 3/0481 715/766 |
| 2006/0168531 | A1* | 7/2006 | Sato | G06F 3/038 715/751 |
| 2007/0094618 | A1* | 4/2007 | Yoshida | G06F 3/038 715/856 |
| 2010/0088634 | A1* | 4/2010 | Tsuruta | G06F 3/0488 715/800 |

FOREIGN PATENT DOCUMENTS

| | | |
|---|---|---|
| JP | 2004-021595 | 1/2004 |
| JP | 2004-280540 | 10/2004 |

OTHER PUBLICATIONS

Office Action dated Mar. 19, 2012 in corresponding Japanese Application No. 2009-044906 (English translation included).
Notice of Allowance dated Aug. 14, 2012 in corresponding Japanese Application No. 2009-044906 (with English translation).

* cited by examiner

FIG. 3

| TERMINAL IDENTIFICATION NUMBER | POINTER NUMBER | DISPLAY COORDINATES |
|---|---|---|
| No. 1 | POINTER A | $(xp1, yp1)$ |
| No. 2 | POINTER B | $(xp2, yp2)$ |
| ⋮ | ⋮ | ⋮ |

FIG. 4

| APPLICATION IDENTIFICATION NUMBER | WINDOW DISPLAY COORDINATES | WINDOW SIZE |
|---|---|---|
| $\alpha$ | $(xa1, ya1)$ | $(Wx1, Wy1)$ |
| $\beta$ | $(xa2, ya2)$ | $(Wx2, Wy2)$ |
| ⋮ | ⋮ | ⋮ |

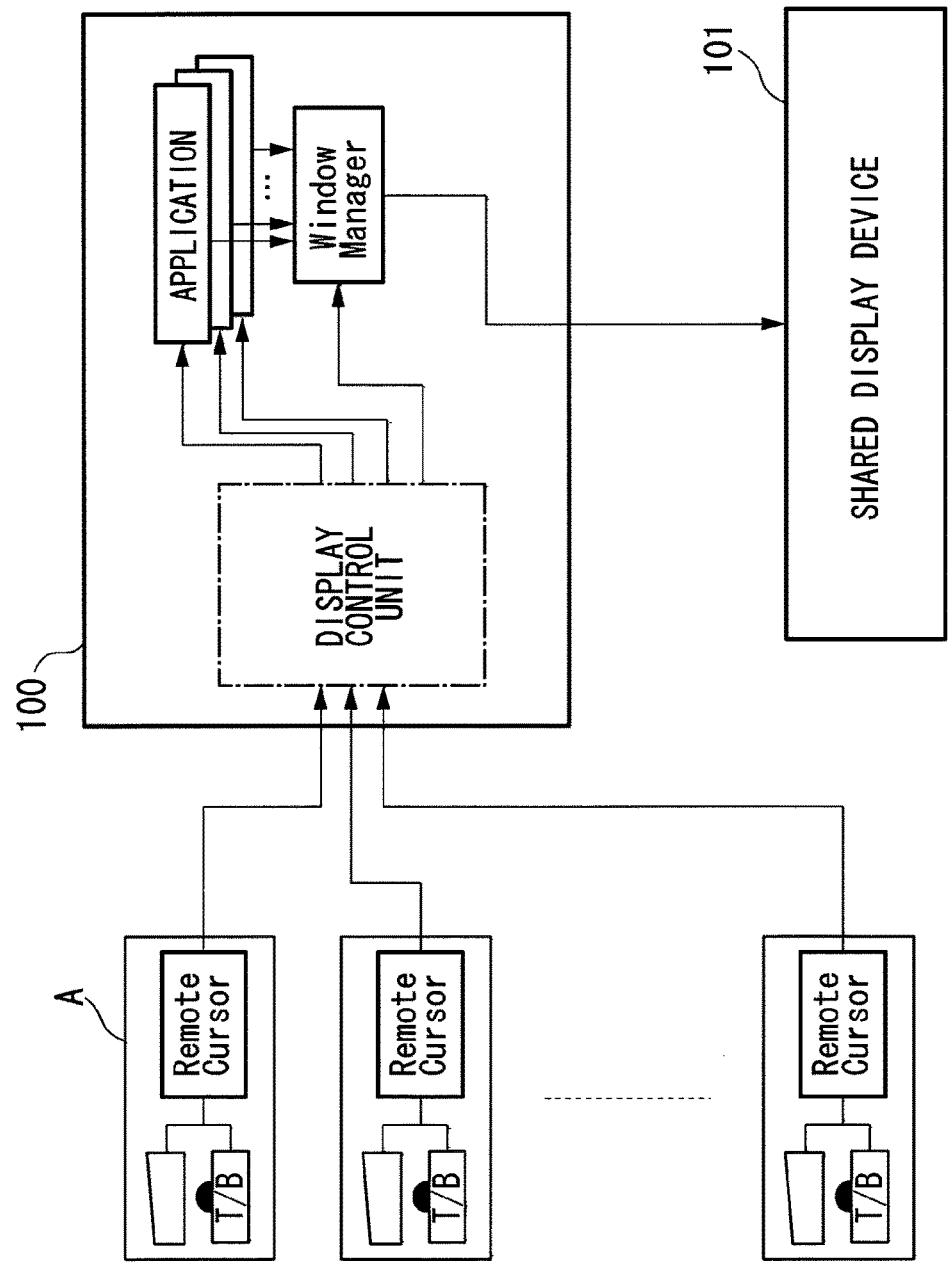

US 9,972,280 B2

DISPLAY CONTROL DEVICE, INPUT OPERATION DEVICE, AND AIR TRAFFIC CONTROL SYSTEM

BACKGROUND OF THE INVENTION

1. Field of the Invention

The present invention relates to a display control device, an input operation device, and an air traffic control system with which operations performed at a plurality of input operation devices can be reflected on a common display screen. This application is based on Japanese Patent Application No. 2009-044906, the content of which is incorporated herein by reference.

2. Description of Related Art

There have hitherto been disclosed display systems in which a shared display server (display control device) that controls display on a shared display device is connected to a plurality of user terminals (input operation devices) via a network so that display operations performed at the individual user terminals can be reflected on the display of the shared display device (e.g., see Japanese Unexamined Patent Application, Publication No. 2004-21595).

As processing methods for sharing a single server among a plurality of user terminals as described above, for example, time-division processing and serial processing are known.

Time-division processing is a processing method in which the processing ability of a central processing unit (CPU) of the server is divided into small time units, and the divided time units are allocated to the individual user terminals so that processing for the individual user terminals is executed sequentially.

The serial processing is a processing method in which individual operations performed at the user terminals are serially processed by the server. For example, in a known display system, the following processing is performed.

For example, referring to FIG. 6, when an operator operating a user terminal A moves a pointer to the position of a window for an intended application while viewing windows shown on a display of a shared display device 101 and issues an input instruction relating to the application, input instruction information indicating operation amounts $\Delta x$ and $\Delta y$ of the pointer and indicating the application is sent to a server 100 in association with identification information of the user terminal.

First, a display processing unit adds the received operation amounts $\Delta x$ and $\Delta y$ to the current display coordinates of the pointer corresponding to the user terminal A to calculate display coordinates after the movement, and moves the pointer to those display coordinates. As a result, on the shared display device 101, the position of the pointer corresponding to the user terminal A is updated.

Furthermore, the server 100 manages information regarding layout of applications on the display in association with identification information of the applications, and determines on the basis of the managed information which application is displayed at the display coordinates of the pointer after the movement. When the application relevant to the input instruction issued by the user terminal A is identified in this manner, the input instruction information received from the user terminal A is output to the corresponding application. Thus, a change in the status of the window, based on the input instruction information, is reflected on the display screen of the shared display device 101.

In the serial processing, the processing described above is executed each time the operation amounts and input instruction are received from individual user terminals, whereby display processing and so forth is executed sequentially on the basis of instructions received from the individual user terminals.

BRIEF SUMMARY OF THE INVENTION

However, in the time-division processing described above, since the processing time allocated to each user terminal is determined according to the number of user terminals, the time allocated to each user terminal decreases as the number of user terminals increases, resulting in the problem of reduced ease-of-use.

In addition, as described above, in the serial processing, since operation events received from the individual user terminals are analyzed at the server and processing for the individual user terminals is executed serially, there exists a problem that the load on the processing unit (CPU) is large. Furthermore, when operation events are received simultaneously from a plurality of user terminals, subsequent processing is not executed until processing executed earlier is finished. Thus, real-time processing is not achieved for the user terminal that has sent a subsequent operation event, and the user experiences poor ease-of-use.

Furthermore, in an air traffic control system, which is used constantly in mission-critical situations, when a failure such as a server failure occurs, quick recovery to the state before the failure is necessary. However, in the time-division processing and serial processing methods described above, it is necessary to activate a new server and restart applications that were running at the time of occurrence of the failure.

It is an object of the present invention to provide a display control device, input operation device, and air traffic control system with which ease-of-use can be improved and with which quick recovery is possible in the event of a failure.

A first aspect of the present invention provides a display control device that is connected to a plurality of input operation devices via a network and that updates content displayed on a shared display device on the basis of operation information received from the input operation devices, the display control device including an information discriminating unit that, upon receiving from one of the input operation devices identification information of the input operation device, identification information of an application, and input instruction information for the application, outputs the received input instruction information to the corresponding application; and a display processing unit that reflects a screen transition caused by application processing based on the input instruction information, on a screen of the shared display device, wherein the display processing unit sends information regarding screen layout of the shared display device to each of the input operation devices at predetermined timing.

The display processing unit corresponds to, for example, a "display managing unit 23" and a "drawing unit 24" in an embodiment of the present invention, which will be described later.

A second aspect of the present invention provides an input operation device used in a display system including a plurality of input operation devices, a shared display device shared by the plurality of input operation devices, and a display control device that is connected to the plurality of input operation devices via a network and that updates a display screen of the shared display device on the basis of operation information from the input operation devices, the input operation device including a storage unit that, upon receiving information regarding screen layout of the shared display device from the display control device, stores the received information regarding the screen layout; an input unit; an operation determining unit that, upon receiving input instruction information for an application provided on the display control device from the input unit, calculates display coordinates of a pointer after movement on the screen of the shared display device on the basis of an amount of operation movement of the input unit and the information regarding the screen layout stored in the storage unit and identifies the application located at the display coordinates of the pointer after the movement; and a sending unit that sends identification information of the application identified by the operation determining unit, the input instruction information for the application, the display coordinates of the pointer after the movement, and identification information relating to device identification information of the input operation device itself in association with each other to the display control device.

According to the above configuration, since an application is identified at the input operation device and identification information of the application and input instruction information are sent in association with each other to the display control device, it is readily possible, at the display control device, to identify the application on the basis of the identification information of the application. Thus, processing for identifying the application on the basis of display coordinates of a pointer at the display control device, which has hitherto been performed, becomes unnecessary, and therefore, processing at the display control device can be reduced. Accordingly, the processing performance at the display control device can be improved, so that ease-of-use and so forth can be improved.

Furthermore, since the application displayed by the display control device is recognized at the input operation device, when a failure of the display control device occurs, the input operation device can function as a backup device to the display control device.

A third aspect of the present invention provides an air traffic control system including the plurality of input operation devices described above, the display control device described above, and a shared display device shared by the plurality of input operation devices.

According to the present invention, there is an advantage that ease-of-use can be improved.

BRIEF DESCRIPTION OF THE SEVERAL VIEWS OF THE DRAWINGS

FIG. 3 is a diagram showing an example of a pointer display table;

FIG. 4 is a diagram showing an example of an application display table;

FIG. 6 is a diagram for explaining a related art.

DETAILED DESCRIPTION OF THE INVENTION

Now, an embodiment of a display control device, an input operation device, and an air traffic control system according to the present invention will be described below with reference to the drawings.

Figure 1:
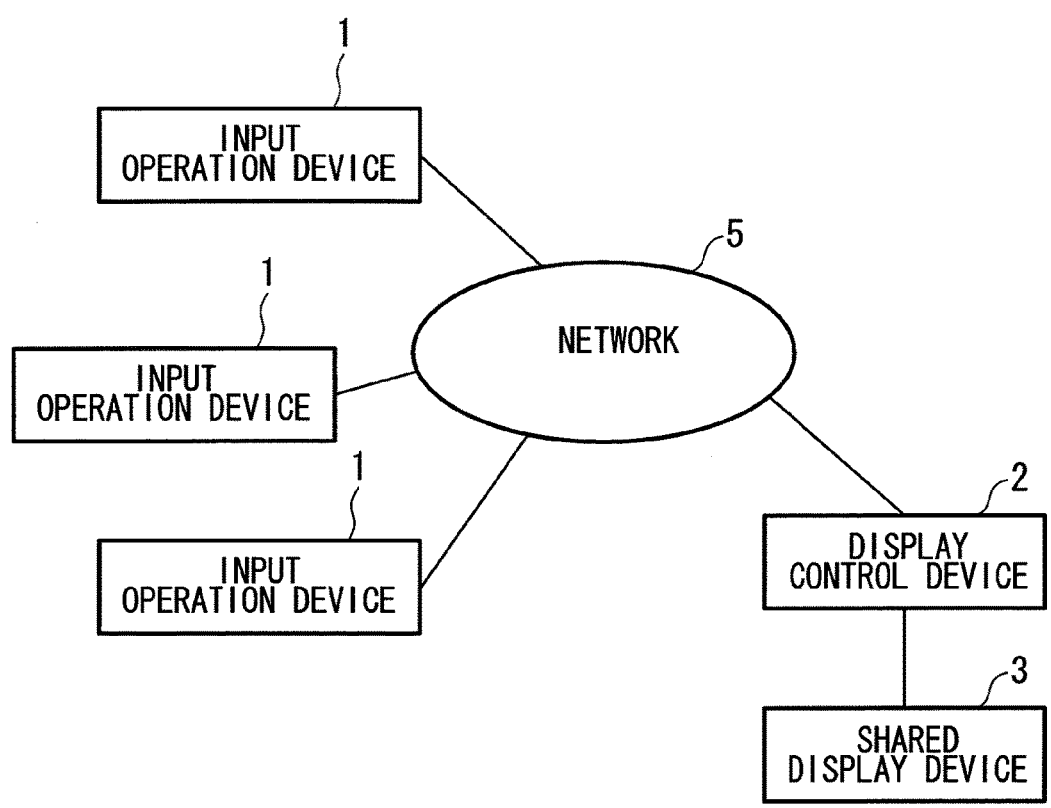
FIG. 1 is a block diagram showing, in outline, the configuration of an air traffic control system according to an embodiment of the present invention.

FIG. 1 is a block diagram showing, in outline, the configuration of the air traffic control system according to this embodiment.

As shown in FIG. 1, the air traffic control system according to this embodiment includes a plurality of input operation devices 1, a display control device 2 connected to the plurality of input operation devices 1 via a network 5, and a shared display device 3 that displays image signals output from the display control device 2.

Each of the input operation devices 1 is an operation terminal that allows an operator to perform pointer operations and operations on windows displayed on a large screen on the shared display device 3. For example, a number of input operation devices 1 corresponding to the number of operators is provided.

The display control device 2 moves pointers displayed on the shared display device 3 on the basis of information input from the individual input operation devices 1 and changes the operation status of applications displayed on the shared display device 3 on the basis of input instruction information input from the individual input operation devices 1.

The shared display device 3 is a display device, such as a liquid crystal display, a plasma display, or a rear projector. The shared display device 3 may be a single-screen display device or a display device in which a large screen is formed by combining a plurality of display devices.

Figure 2:
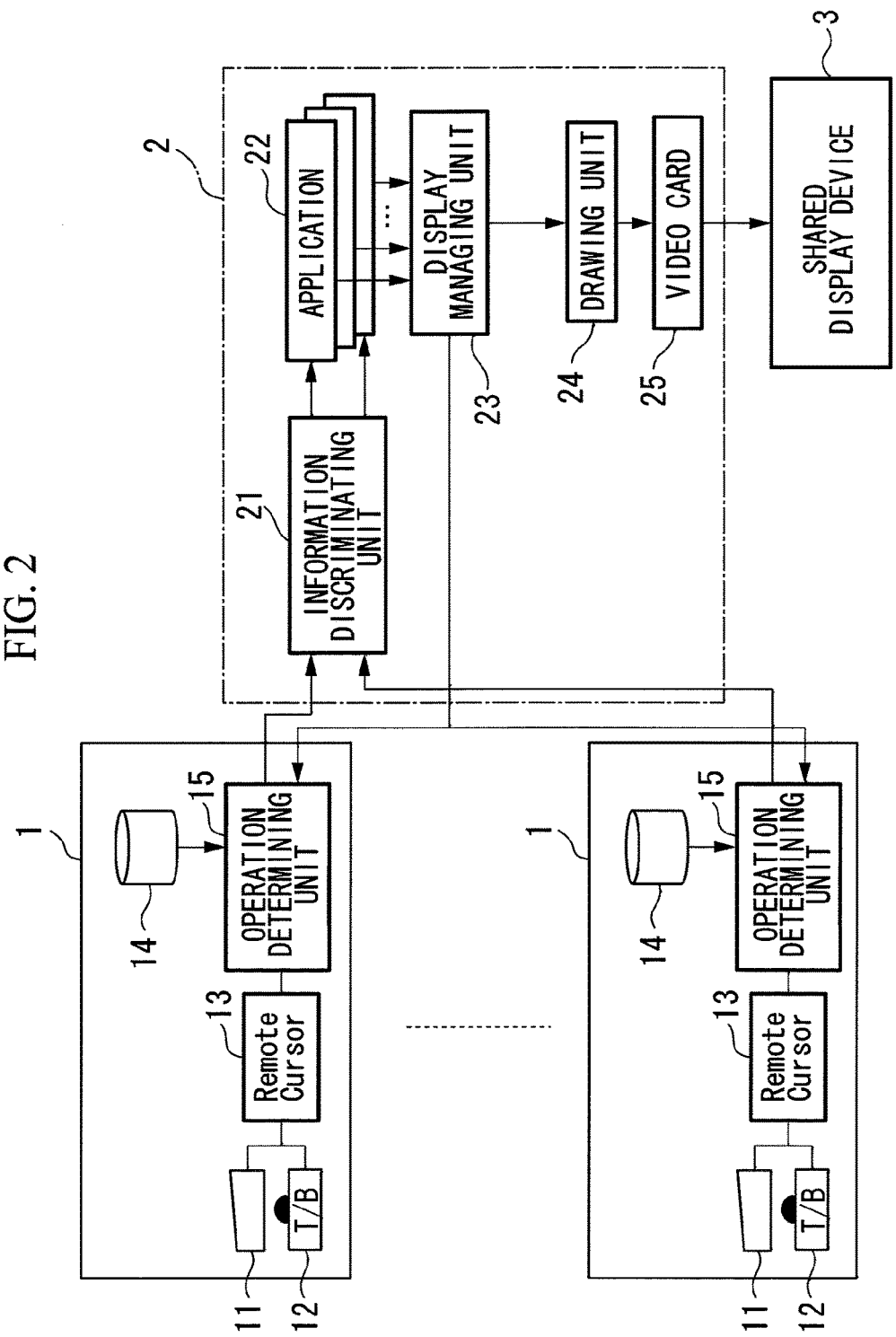
FIG. 2 is a diagram showing further details of the configuration of the air traffic control system shown in FIG. 1.

FIG. 2 is a diagram showing further details of the configuration of the air traffic control system shown in FIG. 1.

As shown in FIG. 2, each of the input operation devices 1 is, for example, an information processing terminal provided with a keyboard 11 and a pointing device 12 as input devices. Each piece of input information input from the keyboard 11 or the pointing device 12 is sent to a remote cursor 13.

The remote cursor 13 calculates a pointer shift amount on the display screen of the shared display device 3 on the basis of the amount of operation movement of the input device, and outputs the pointer shift amount and information regarding an action, such as clicking, to an operation determining unit 15.

A storage unit 14 stores a pointer display table and an application display table. FIG. 3 shows an example of the pointer display table, and FIG. 4 shows an example of the application display table.

As shown in FIG. 3, in the pointer display table, identification information of the individual input operation devices 1, pointer numbers, and display coordinates are associated with each other. Furthermore, as shown in FIG. 4, in the application display table, identification information of applications, window display coordinates of the applications, and window sizes of the applications are associated with each other. Thus, it is possible to identify which application is displayed in which area of the display screen of the shared display device 3.

The operation determining unit 15, upon receiving only an amount of operation movement of an input device from the remote cursor 13, reads out the pointer number associated with the identification information of the relevant input operation device 1 and the display coordinates of the pointer from the pointer display table stored in the storage unit 14, adds the pointer shift amount received from the remote cursor 13 to the display coordinates, thereby obtaining display coordinates of the pointer after the movement, and outputs the display coordinates in association with the pointer number to the display control device 2.

In addition, the operation determining unit 15, upon receiving an amount of operation movement of an input device and information regarding an action from the remote cursor 13, calculates display coordinates after the movement with reference to the pointer display table stored in the storage unit 14 and identifies the identification information of the application displayed at the display coordinates after the movement with reference to the application display table. Then, the pointer display coordinates after the movement, the pointer number, the identification information of the application, and the input instruction information corresponding to the action are output in association with each other to the display control device 2.

Note that the pointer display table and the application display table stored in the storage unit 14 are information managed in a display managing unit 23 of the display control device 2, which will be described later. Through communication between the individual input operation devices 1 and the display control device 2 at predetermined timing, the information in the tables managed in the display managing unit 23 is reported to the individual input operation devices 1 and stored in the storage units 14. For example, by reporting the information to the individual input operation devices 1 when the tables are updated, it is possible to keep the information in the tables stored in the individual storage units 14 constantly up-to-date.

The display control device 2 includes an information discriminating unit 21, a plurality of application software programs (hereinafter referred to as "applications") 22, a display managing unit 23, a drawing unit 24, a video card 25, and so forth. Each of these components of the display control device 2 may be implemented in hardware, or may be implemented partially in software. When processing is implemented in software, a program for implementing the processing is recorded on a computer-readable recording medium, and a central processing unit (CPU) reads out and executes the program. Furthermore, the display control device 2 may be implemented by a plurality of separate hardware units or by a single hardware unit.

When the information received from the input operation device 1 includes information relating to an application, the information discriminating unit 21 outputs input instruction information to an application 22 identified on the basis of the identification information of the application and outputs the pointer display coordinates after the movement and the pointer number to the display managing unit 23. At this time, the information discriminating unit 21 should suitably convert the input instruction information in accordance with the interface specifications of a window system for the destination application before outputting the information.

On the other hand, when the information received from the input operation device 1 does not include information relating to an application, the information discriminating unit 21 outputs the pointer display coordinates after the movement and the pointer number to the display managing unit 23.

The application 22 is an application program that is started, controlled, and exited according to input instruction information from the input operation devices 1. Furthermore, the application 22 executes processing according to the input instruction information received from the information discriminating unit 21, and if transition of display occurs in relation to the execution of the processing, the application 22 outputs information regarding the display to the display managing unit 23 as needed.

As described earlier, the display managing unit 23 manages the pointer display table and the application display table. The display managing unit 23 updates the pointer display table on the basis of the information received from the information discriminating unit 21, i.e., the pointer number and the display coordinates of the pointer after the movement, and outputs the pointer number and the display coordinates after the movement to the drawing unit 24.

Furthermore, when display screen information for window transition, information for changing the size or position of a window, or the like relating to the processing is received from the application 22, the display managing unit 23 updates the application display table on the basis of the information and outputs information regarding display to the drawing unit 24.

The drawing unit 24 has, for example, a graphic screen corresponding to the display screen area of the shared display device 3. The drawing unit 24 displays a pointer at a corresponding position on the graphic screen on the basis of the pointer number and the display coordinates of the pointer input from the display managing unit 23. Furthermore, when information regarding a screen transition or a change in the size or position of an application is received, the display managing unit 23 changes the size or position of a window for the application on the graphic screen on the basis of the information or changes the content displayed in the window.

Figure 5:
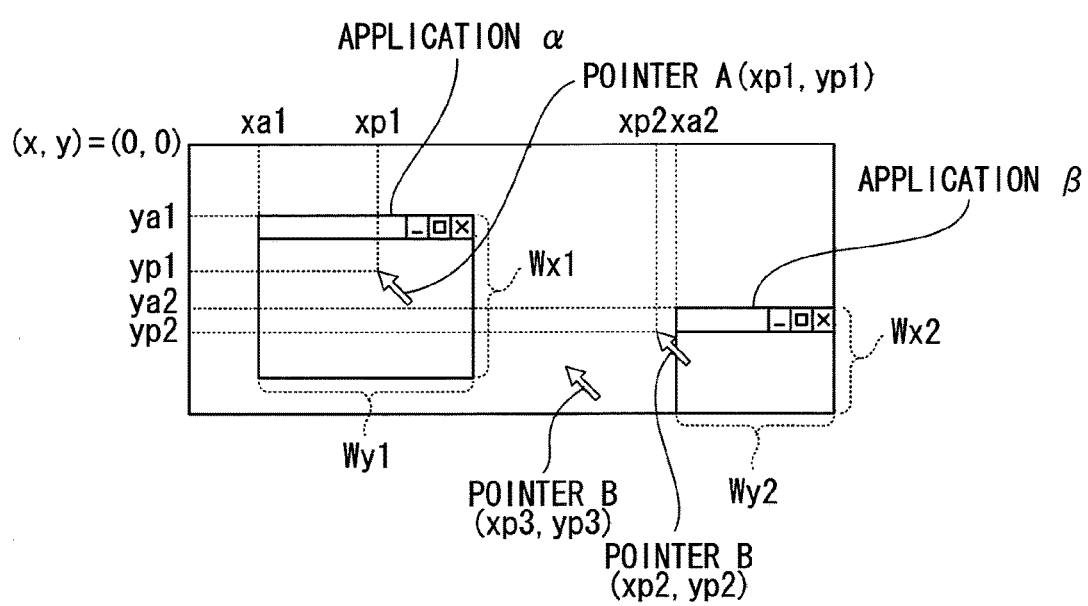
FIG. 5 is a diagram showing an example of a graphic screen.

FIG. 5 is a diagram for explaining an overview of the graphic screen. Referring to FIG. 5, the graphic screen has a coordinate origin (0, 0) set at the top left of the screen, and an x axis is set horizontally and a y axis is set vertically from the top left. Specifically, the x and y axes are set so that the x coordinate value increases rightward and the y coordinate value increases downward from the top left.

Processing to be implemented in the drawing unit 24 is executed by the CPU reading out and executing preinstalled application software relating to drawing.

The video card 25 is an ordinary video card installed in an information processing terminal or the like. The video card 25 converts the graphic screen after the pointer and so forth are drawn by the drawing unit 24 into video signals and outputs the video signals to the shared display device 3.

The shared display device 3 performs display on the basis of the video signals input from the video card 25. Thus, display is performed substantially in real time on the basis of input operations from the input operation devices 1.

Next, a processing procedure regarding display control of the air traffic control system according to this embodiment will be described. Here, a description will be given regarding a case where an operator moves the position of the pointing device 12 of the input operation device 1 while viewing the pointer displayed on the shared display device 3 and then issues an input instruction for an application.

First, when the operator moves the position of the pointing device 12 of the input operation device 1 while viewing the pointer displayed on the shared display device 3, the amount of operation movement of the pointing device 12 is input to the remote cursor 13. On the basis of the amount of operation movement, the remote cursor 13 calculates pointer shift amounts $\Delta x$ and $\Delta y$ along the x and y axes on the pointer screen, and outputs the calculated pointer shift amounts to the operation determining unit 15.

The operation determining unit 15 reads out the current display coordinates of the pointer from the pointer display table stored in the storage unit 14, and adds the pointer shift amounts received from the remote cursor 13 to the display coordinates, thereby obtaining display coordinates after the movement. For example, when the current display coordinates are $(xp1, yp1)$, by adding the pointer shift amounts $\Delta x$ and $\Delta y$ to the display coordinates, display coordinates after the movement $(xp1+\Delta x, yp1+\Delta y)$ is obtained.

The operation determining unit 15 sends the display coordinates after the movement (xp1+Δx, yp1+Δy) and the pointer number, e.g., "pointer A", in association with each other to the display control device 2.

Upon receiving the display coordinates (xp1+Δx, yp1+Δy) and the pointer number "pointer A" from the input operation device 1, the information discriminating unit 21 of the display control device 2 outputs this information to the display managing unit 23.

The display managing unit 23 updates the pointer display table on the basis of the received display coordinates (xp1+Δx, yp1+Δy) and the pointer number "pointer A". Furthermore, after updating the pointer display table, the display managing unit 23 sends information of the updated pointer display table (e.g., difference information) to the individual input operation devices 1 via the network 5. Thus, the pointer display tables stored in the storage units 14 of the individual input operation devices 1 are updated.

Furthermore, in parallel with sending of the information and so forth as described above, the display managing unit 23 outputs the information input from the information discriminating unit 21 to the drawing unit 24.

The drawing unit 24 moves the pointer having the pointer number "pointer A" to the display coordinates (xp1+Δx, yp1+Δy) on the graphic screen. Thus, a graphic screen in which the pointer A is drawn at the display coordinates after the movement is generated, and this graphic screen is converted into video signals which are then output to the shared display device 3. Accordingly, the position of the pointer A is moved on the shared display device 3.

Then, when the pointer has been moved onto the intended application by the input operation, the operator inputs desired input instruction information in that state. The input instruction information varies depending on the application, and can be various types of instructions, such as a text input instruction, a start instruction, an exit instruction, or an instruction for changing the window size.

The operation determining unit 15 obtains the display coordinates of the pointer from the storage unit 14 with reference to the pointer display table, and, in addition, identifies the application displayed at the display coordinates of the pointer with reference to the application display table. Then, the operation determining unit 15 outputs the identification information of the identified application, the input instruction information input by the operator, and the pointer number in association with each other to the display control device 2.

Upon receiving the information, the information discriminating unit 21 of the display control device 2 outputs the input instruction information to the relevant application 22. The application 22 executes processing on the basis of the input instruction information. Furthermore, when a display transition occurs during execution of the processing, the application 22 outputs information of the display screen after the transition to the display managing unit 23.

When a change occurs such as a change in the window size of the application or a change in the position of the window, the display managing unit 23 updates the application display table on the basis of information of the change. Furthermore, when the window size or position does not change but the content displayed in the window changes, the display managing unit 23 outputs display information received from the application 22 to the drawing unit 24 without updating the application display table.

Furthermore, when the application display table has been updated, the display managing unit 23 sends the updated application display table to the individual input operation devices 1. Thus, the application display tables in the storage units 14 of the individual input operation devices 1 are updated.

The drawing unit 24 changes the graphic screen on the basis of the display information received from the display managing unit 23 and outputs the graphic screen after the change to the video card 25. Thus, the graphic screen after the change is converted into video signals, and the video signals are output to the shared display device 3, whereby the display screen of the shared display device 3 is updated.

As described above, with the display control device, the input operation device, and the air traffic control system according to this embodiment, an application is identified at the input operation device 1, and identification information of the application and input instruction information are sent in association with each other to the display control device 2. Thus, at the display control device 2, it becomes readily possible to identify the application on the basis of the identification information of the application. Accordingly, at the display control device 2, processing such as identifying an application on the basis of the position of a pointer corresponding to each of the input operation devices 1 becomes unnecessary, and thereby the processing load on the display control device 2 can be reduced. Furthermore, by reducing the processing load on the display control device 2, the processing performance for instructions received from the individual input operation devices 1 can be improved, so that responsiveness and ease-of-use can be improved.

In the embodiment described above, instead of outputting the amounts of operation movement of a pointer, input from an input device, to the operation determining unit 15 each time, the remote cursor 13 may integrate the amounts of operation movement during a predetermined period and output the result to the operation determining unit 15. For example, if the amounts of operation movement during a predetermined sampling period are ΔX1 and ΔY1 and the amounts of operation movement during the next sampling period are ΔX2 and ΔY2, the integrated values ΔX1+ΔX2 and ΔY1+ΔY2 may be output to the operation determining unit 15 as the amounts of operation movement. The period for integrating the amounts of operation movement may be determined as desired. Although the processing load decreases as the period becomes longer, ease-of-use is degraded. Therefore, it is preferable to set a balanced period in consideration of these conflicting aspects.

What is claimed is:

1. An input operation device used in a display system including a plurality of input operation devices, a shared display device an entire display screen of which is shared by the plurality of input operation devices, and a display control device configured to be connected to the plurality of input operation devices via a network and configured to update the display screen of the shared display device based on operation information from the input operation devices, the input operation device comprising:

a storage unit configured to, upon receiving information regarding a screen layout of the shared display device from the display control device, via the network, stores the received information regarding the screen layout;

an input unit;

an operation determining unit that, upon receiving input instruction information for an application provided on the display control device from the input unit, calculates pointer display coordinates after a movement of a pointer on the display screen of the shared display device based on (i) an amount of operation movement of the input unit and (ii) the information regarding the screen layout stored in the storage unit and identifies the application located at the pointer display coordinates after the movement of the pointer; and a sending unit configured to send operation information only for the input operation device of the plurality of input operation devices, the operation information including a pointer number, the pointer display coordinates after the movement of the pointer, identification information of the application identified by the operation determining unit, and the input instruction information for the identified application to the display control device, via the network, wherein the pointer display coordinates correspond to display screen coordinates of the shared display device, and wherein the operation determining unit calculates the pointer display coordinates after the movement of the pointer on the display screen of the shared display device, upon receiving only the amount of the operation movement from the input unit, and the sending unit sends the pointer display coordinates after the movement of the pointer calculated by and output from the operation determining unit together with the pointer number as the operation information to the display control device, via the network.

2. The input operation device according to claim 1, wherein the screen layout of the shared display device includes a pointer display table in which identification information of the individual input operation devices, the pointer number, and the pointer display coordinates are associated with each other.

3. The input operation device according to claim 2, wherein the screen layout of the shared display device includes an application display table in which identification information of the application, window display coordinates of the application on the display screen of the shared display device, and a window size of the application are associated with each other.

4. An input operation device for use in a system including a display control device and a shared display device having a display screen, an entirety of the display screen being shared by a plurality of input operation devices including the input operation device, the input operation device comprising:

an input unit;

a storage unit configured to store information regarding a screen layout of the shared display device when the information is received from the display control device;

an operation determining unit that is configured to:
when the operation determining unit receives information regarding an action for an application provided on the display screen of the shared display device from the input unit, calculate pointer display coordinates after a movement of a pointer on the display screen of the shared display device based on an amount of operation movement of the input unit, and identify the application based on the pointer display coordinates after the movement of the pointer and the information regarding the screen layout stored in the storage unit; and when the operation determining unit receives only the amount of operation movement of the input unit, calculate the pointer display coordinates after the movement of the pointer on the display screen of the shared display device; and a sending unit configured to send operation information only for the input operation device of the plurality of input operation devices, wherein:
when the operation determining unit receives the information regarding the action for the application, the sending unit sends first operation information including the information regarding the action for the identified application, the pointer display coordinates after the movement of the pointer, the application identified by the operation determining unit, and a pointer number to the display control device; and when the operation determining unit receives only the amount of operation movement of the input unit, the sending unit sends second operation information including the pointer display coordinates after the movement of the pointer and the pointer number to the display control device.

5. The input operation device according to claim 4, wherein
the storage unit is configured to store a pointer display table and an application display table,
the pointer display table includes, for each of the input operation devices, identification information of the input operation device, a pointer number, and display coordinates associated with each other, and
the application display table includes, for each application, identification information of the application, window display coordinates of the application, and a window size of the application associated with each other.

6. An air traffic control system comprising:
an input operation device;
a display control device; and
a shared display device having a display screen, an entirety of the display screen being shared by a plurality of input operation devices including the input operation device, wherein
the input operation device comprises:
an input unit;
a storage unit configured to store information regarding a screen layout of the shared display device when the information is received from the display control device;
an operation determining unit that is configured to:
when the operation determining unit receives information regarding an action for an application provided on the display screen of the shared display device from the input unit, calculate pointer display coordinates after a movement of a pointer on the display screen of the shared display device based on an amount of operation movement of the input unit, and identify the application based on the pointer display coordinates after the movement of the pointer and the information regarding the screen layout stored in the storage unit; and
when the operation determining unit receives only the amount of operation movement of the input unit, calculate the pointer display coordinates after the movement of the pointer on the display screen of the shared display device; and
a sending unit configured to:
when the operation determining unit receives the information regarding the action for the application, send first operation information including the information regarding the action for the identified application, the pointer display coordinates after the movement of the pointer, the application identified by the operation determining unit, and a pointer number to the display control device; and when the operation determining unit receives only the amount of operation movement of the input unit, send second operation information including the pointer display coordinates after the movement of the pointer and the pointer number to the display control device, the display control device comprises:

a display processing unit; and an information discriminating unit that is configured to:

when the information discriminating unit receives the first operation information, output the pointer display coordinates after the movement of the pointer and the pointer number to the display processing unit, and output the information regarding the action for the identified application to the application identified by the operation determining unit; and when the information discriminating unit receives the second operation information, output only the pointer display coordinates after the movement of the pointer and the pointer number to the display processing unit, wherein the display processing unit is configured to:

when the information discriminating unit receives the first operation information, cause the display screen of the shared display device to reflect a screen transition caused by application processing based on the information regarding the action for the identified application and the movement of the pointer based on the pointer display coordinates after the movement of the pointer and the pointer number; and when the information discriminating unit receives the second operation information, cause the display screen of the shared display device to reflect the movement of the pointer based on the pointer display coordinates after the movement of the pointer and the pointer number, and send information regarding the screen layout of the shared display device to each of the plurality of input operation devices at a predetermined timing.

7. The air traffic control system according to claim 6, wherein the storage unit is configured to store a pointer display table and an application display table, the pointer display table includes, for each of the input operation devices, identification information of the input operation device, a pointer number, and display coordinates associated with each other, and the application display table includes, for each application, identification information of the application, window display coordinates of the application, and a window size of the application associated with each other.

* * * * *